United States Patent

Schmidt

[15] 3,697,504
[45] Oct. 10, 1972

[54] PROCESS OF MAKING PURINE BASE NUCLEOSIDE-5' CARBOXYLIC ACIDS

[72] Inventor: Robert Richard Schmidt, Stuttgart, Germany

[73] Assignee: Zellstoffabrik Waldhof, Mannheim, Germany

[22] Filed: July 29, 1969

[21] Appl. No.: 846,656

[30] Foreign Application Priority Data

July 30, 1968 Germany..........P 17 95 020.8

[52] U.S. Cl. ..........................................260/211.5 R
[51] Int. Cl. ..............................................C07d 51/54
[58] Field of Search.........260/211.5 R, 234 R, 209 R

[56] References Cited

UNITED STATES PATENTS 3,251,781   5/1966   Jordan....................260/209 R
3,297,604   1/1967   Germino.................260/209 R
3,431,252   3/1969   Walton ................260/211.5 R

*Primary Examiner*—Lewis Gotts
*Assistant Examiner*—Johnnie R. Brown
*Attorney*—Michael S. Striker

[57] ABSTRACT

Purine-nucleoside-5'-carboxylic acids are made by subjecting a purine-nucleoside, in which the 2',3'-cis-oriented hydroxy groups are protected by blocking groups, to oxidation with an excess of potassium permanganate in an alkaline aqueous solution, followed by precipitation of the 5'-carboxylic acid. Subsequently the blocking groups may be split off.

The compounds are valuable intermediates for making various pharmaceutical products, particularly cancerostatics.

11 Claims, No Drawings

PROCESS OF MAKING PURINE BASE NUCLEOSIDE-5' CARBOXYLIC ACIDS

BACKGROUND OF THE INVENTION

This invention relates to a process for making purine-nucleoside-5'-carboxylic acids. These acids are of value for making various products for use particularly in pharmaceutical chemistry. For instance, 2',3'-isopropylidene-purine-nucleoside-5'-carboxylic acid and the corresponding purine-nucleoside-5'-carboxylic acid are valuable intermediates for making 5'-carboxylic acid derivatives such as esters, thioesters, amides, mixed anhydrides and similar derivatives, which may be used as inhibitors for enzymatic processes and inhibitors for growths of cancer cells.

2',3'-isopropylideneadenosine-5'-carboxylic acid is a valuable starting product also for producing deuterium and tritium into the 5'-C-atom.

Adenosine-5'-carboxylic acid has been obtained by Hogencamp et al. and Weissbach et al. by photolysis of 5'-desoxyadenosyl-cobalamine along with other by-products split off from the adenosine. No statements regarding the yield were made by these authors.

This method undoubtedly is not suited for industrial use. The process proposed by Todd et al. for making adenosine-5'-carboxylic acid by oxidation with the oxygen of the air over a platinum dioxide contact, allegedly has resulted in a 52 percent yield. It was found, however, that the ease with which the catalyst undergoes poisoning causes extreme difficulties and therefore also results in a highly unsatisfactory yield.

The invention therefore has the object to provide for a non-catalytic process for the synthesis of purine-nucleoside-5'-carboxylic acids.

SUMMARY OF THE INVENTION

This object is met by subjecting a purine nucleoside in which the 2',3'-cis-oriented hydroxy groups are protected by blocking groups, to oxidation with an excess of potassium permanganate in an alkaline aqueous solution followed by precipitation of the 2',3'-substituted 5'-purine-nucleoside-carboxylic acid.

DESCRIPTION OF THE PREFERRED EMBODIMENTS

As stated, the 2',3'-cis-oriented hydroxy group in the starting nucleoside must be protected by blocking groups. This type of blocking reaction is well known. The hydroxy group may for instance be protected by a preliminary reaction with ketals, orthoformate, phosgene, ethylvinyl ether, dihydropyran and similar reactions. A preferred blocking group is the isopropylidene or oxy-isopropylidene group.

The oxidation reaction is preferably carried out at room temperature.

The excess potassium permanganate may be eliminated prior to precipitation of the carboxylic acid, for instance by reaction with hydrogen peroxide.

There is thus obtained in the main reaction a 2',3'-substituted 5'-purine-nucleoside carboxylic acid. The 2',3' completion of the main reaction. This may be done by reaction with aqueous hydrochloric acid followed by neutralization. In this manner the unsubstituted purine-5'-carboxylic acid may be obtained by precipitation reaction, for instance by neutralizing the acidic product obtained in the hydrolysis with hydrochloric acid. The neutralization may be effected to a pH of 3.5 or 4.0 using sodium hydroxide or sodium bicarbonate.

The purine base in the starting product may for instance be inosine or adenosine.

The following examples will illustrate the invention.

EXAMPLE 1

1.03 g (3.3 millimol) of 2',3'-isopropylidene-inosine were dissolved in 700 ml water upon application of heat and then reacted at 20° C. with 0.56 g (10 mmol) of potassium hydroxide and subsequently with 2.13 g (13.5 mmol) of potassium permanganate. The reaction was carried out batchwise during a period of 2 hours. After a reaction time of 40 hours, filtration was effected and the excess potassium permanganate was destroyed with hydrogen peroxide followed by repeated filtration, concentration to dryness in a vacuum, several washings with a small amount of ethanol and dissolving of the residue in a small amount of water. The residue was then adjusted with hydrochloric acid to a pH of 4 and the precipitate that formed was removed by filtration and washed with ice water. There was thus obtained an analytically pure 2',3'-isopropylidene-inosine-5'-carboxylic acid.

Yield: 0.85 g (80% of the theoretical yield)
M.P. : 248–250°C upon rapid heating
Analysis: $C_{13}H_{14}N_4O_6$ (322.3)

|  | C | H | N |
|---|---|---|---|
| theoret.: | 48.5 | 4.4 | 17.3 |
| found : | 48.41 | 4.44 | 17.10 |

EXAMPLE 2

2.05 g (6.7 mmol) of 2',3'-O-isopropylideneadenosine were dissolved in 700 ml water upon application of heat. The solution was cooled to room temperature. 1.12 g (20 mmol) of potassium hydroxide were then added upon stirring and subsequently 4.29 g (27 mmol) of potassium permanganate were also added within a period of 2 hours. The mixture was then subjected to stirring for 3 days at room temperature. The excess potassium permanganate was destroyed with hydrogen peroxide, the manganese dioxide was removed by filtration and the clear solution was concentrated in vacuum to about 150 ml and adjusted by dilute hydrochloric acid at 0° C. to a pH of 4.6.

There was thus precipitated an analytically pure 2',3'-O-isopropylidene-adenosine-5'-carboxylic acid. This product could be recrystallized using a large amount of water.

Yield: 1.50 g (69% of the theoretical yield)
M.P. : 276°C (decomposition)
Analysis: $C_{13}H_{15}N_5O_5$ (321.3)

|  | C | H | N |
|---|---|---|---|
| theoret.: | 48.59 | 4.71 | 21.80 |
| found : | 48.60 | 4.75 | 21.47 |

EXAMPLE 3

0.32 g of the 2',3'-O-isopropylidene-adenosine-5'-carboxylic acid obtained by the process in Example 2 were subjected to hydrolysis in hydrochloric acid employed in an amount of 15 ml during a time of 20 minutes at a temperature of 65° C. The solution was subsequently cooled to 20° C. and the pH was adjusted with 2 n sodium hydroxide to 4.0. As a result there precipitated adenosine-5'-carboxylic acid as a colorless crystalline mass.

Yield: 0.27 g (96% of the theoretical yield)
M.P.: 320°C

The compound matched spectroscopically and chromatographically with a specimen synthesized by the Todd et al. method.

EXAMPLE 4

280 mg (0.87 mmol) of the 2',3'-isopropylidene-inosine-5'-carboxylic acid obtained in the process of Example 1 were dissolved in 15 ml of hydrochloric acid which had been preheated to 65° C. The reaction mass was then maintained at this temperature for 20 minutes. The clear solution was thereupon cooled to 20° C and immediately neutralized with sodium bicarbonate. The solution was then adjusted to a pH of 3.5 with dilute hydrochloric acid. There precipitated inosine-5'-carboxylic acid as a white crystalline mass. The product was subsequently re-crystallized from ethanol/water.

Yield: 150 mg (60% of the theoretical yield)
Decomposition between 180 and 200°C without a clear melting point.
Analysis:
| | C 42.56 | H 3.57 | N 19.85 |
|---|---|---|---|
| theoret.: | C 42.56 | H 3.57 | N 19.85 |
| found: | 42.45 | 3.6 | 19.7 |

The removal of the blocking group as illustrated in Examples 3 and 4 using, for instance, aqueous hydrochloric acid, results in a virtually quantitative yield and in an analytically pure and chromatographically uniform product which is the free purine-nucleoside-5'-carboxylic acid. For the removal of the blocking groups other mineral acids can also be employed. The invention is not limited to the use of hydrochloric acid.

I claim:

1. The process of making a purine-nucleoside-5'-carboxylic acid comprising subjecting a purine-nucleoside in which the 2',3'-cis-oriented hydroxy groups are protected by blocking groups, to oxidation with an excess of potassium permanganate in an alkaline solution followed by precipitation of the 2',3'-substituted 5'-nucleoside-carboxylic acid.

2. The process of claim 1, wherein the oxdation is effected at room temperature.

3. The process of claim 1, wherein the excess potassium permanganate is eliminated with hydrogen peroxide prior to precipitation of the carboxylic acid.

4. The process of claim 1, wherein the precipitation of the carboxylic acid is effected by reaction with hydrochloric acid.

5. The process of claim 1, wherein the pH of the oxidation solution is adjusted to between 4.0 and 4.6 to effect the said precipitation.

6. The process of claim 1, wherein the blocking groups or group are split off after completion of the oxidation reaction.

7. The process of claim 1 wherein the blocking group is an isopropylidene or oxy-isopropylidene group.

8. The process of claim 6, wherein the splitting off of the blocking group is effected by reaction with an aqueous mineral acid followed by neutralization of the mass and precipitation of the unsubstituted purine-nucleoside--5'-carboxylic acid.

9. The process of claim 8 wherein the mineral acid is aqueous hydrochloric acid.

10. The process of claim 1, wherein 2',3'iso-propylidene- or oxy-isopropylidene-substituted inosine or adenosine are dissolved in an aqueous alkaline medium and reacted with an excess of potassium permanganate followed by precipitation of the corresponding 2',3'-isopropylidene or oxy-isopropylidene-substituted inosine or adenosine--5'-carboxylic acid by reaction with a mineral acid.

11. The process of claim 10, wherein the 2',3'-isopropylidene or oxy-isopropylidene-substituted inosine or adenosine-5'-carboxylic acid is subsequently hydrolized with aqueous hydrochloric acid followed by precipitation of the unsubstituted inosine or adenosine 5'-carboxylic acid by neutralizing the acidic hydrolysis solution.

* * * * *